United States Patent
Tompkins

(10) Patent No.: US 9,569,240 B2
(45) Date of Patent: Feb. 14, 2017

(54) METHOD AND SYSTEM TO PROVISION AND MANAGE A COMPUTING APPLICATION HOSTED BY A VIRTUAL INSTANCE OF A MACHINE

(75) Inventor: David Tompkins, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1056 days.

(21) Appl. No.: 12/506,914

(22) Filed: Jul. 21, 2009

(65) Prior Publication Data

US 2014/0033200 A1  Jan. 30, 2014

(51) Int. Cl.
| | | |
|---|---|---|
| *G06F 15/177* | (2006.01) | |
| *G06F 9/455* | (2006.01) | |
| *G06F 9/44* | (2006.01) | |
| *H04L 29/06* | (2006.01) | |
| *H04L 29/08* | (2006.01) | |
| *G06F 9/48* | (2006.01) | |

(52) U.S. Cl.
CPC ......... *G06F 9/45558* (2013.01); *G06F 9/4416* (2013.01); *G06F 9/4843* (2013.01); *H04L 63/061* (2013.01); *H04L 67/1002* (2013.01); *G06F 2009/45575* (2013.01); *G06F 2009/45587* (2013.01)

(58) Field of Classification Search
USPC .... 714/6.31, 15, 29, 747; 726/14, 22; 713/1, 713/2, 100; 703/22
See application file for complete search history.

(56) References Cited

U.S. PATENT DOCUMENTS

| | | | |
|---|---|---|---|
| 7,788,524 B2 | 8/2010 | Wing et al. | |
| 7,870,153 B2 * | 1/2011 | Croft et al. | 707/781 |
| 2005/0108593 A1 | 5/2005 | Purushothaman et al. | |
| 2005/0182966 A1 | 8/2005 | Pham et al. | |
| 2005/0251802 A1 | 11/2005 | Bozek et al. | |
| 2006/0136720 A1 | 6/2006 | Armstrong et al. | |
| 2009/0222815 A1 | 9/2009 | Dake | |
| 2011/0004791 A1 | 1/2011 | Kokubu et al. | |

OTHER PUBLICATIONS

"U.S. Appl. No. 12/506,919, Non-Final Office Action mailed Apr. 6, 2011", 11 pgs.
"U.S. Appl. No. 12/506,919, Response filed Jul. 6, 2011 to Non-Final Office Action mailed Apr. 6, 2011", 10 pgs.

* cited by examiner

*Primary Examiner* — Eleni Shiferaw
*Assistant Examiner* — Paul Callahan
(74) *Attorney, Agent, or Firm* — Shook, Hardy & Bacon L.L.P.

(57) ABSTRACT

A system and method are described for provisioning and managing virtual instances of a computing application running within a public virtualization space (referred to as a hosted service system). A hosted service system may be configured to provide automated administration of the computing application, replacing the administration tasks that would otherwise be performed by the customer when running in an on-premise production deployment and to provide encrypted networking and other services that are specific to the public virtualization environment and are designed to provide a secure integration fabric between a customer's own private data center and virtual instances of the computing application running within an insecure public virtualization service.

16 Claims, 5 Drawing Sheets

METHOD AND SYSTEM TO PROVISION AND MANAGE A COMPUTING APPLICATION HOSTED BY A VIRTUAL INSTANCE OF A MACHINE

TECHNICAL FIELD

This disclosure relates generally to the technical fields of software and/or hardware technology and, in one example embodiment, to systems and methods for provisioning and managing a computing application hosted by a virtual instance of a machine.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Enterprise application software has traditionally been delivered using three-tiered architecture, with a user interface tier, a server or business logic tier, and a database tier. These applications are typically deployed locally by a customer within their own data center, on their own hardware, and with their own support staff. Each application operates within its own "silo" of hardware, software, and support that does not leverage any of the resources that all such enterprise applications share. The initial cost to deploy an enterprise application with this architecture is substantial, in both dollars and time, and this initial cost has always been an obstacle to the sale of enterprise software to the small and medium business (SMB) market.

A two-tiered application architecture that relies upon a web browser-based client tier and a remotely deployed internet-accessible server tier to provide functionality that was previously delivered via a locally deployed three-tiered application is commonly referred to as software-as-a-service (SaaS) or Cloud Computing. A SaaS approach is intended to leverage the shared functions of computing applications, together with shared hardware, data, and support capacities, in order to provide a user experience with improved scalability, extensibility, maintainability, and with significantly reduced up-front costs. The term software-as-a-service (SaaS) is used as a blanket term for a set of features that uses a two-tiered network-accessible hosted service architecture.

The phrase "cloud computing" refers to an architectural paradigm in which computation is moved from local servers to a remote service that provides computation as a commodity or utility. A "cloud" is typically a large collection of shared commodity computation resources that can be interchangeably provisioned for client computation requests. Cloud computing is frequently used in SaaS application architectures and may be viewed as an implementation choice for application deployment that leverages shared resources and improved cost structure of the cloud. A cloud computing approach may be used to implement a variety of computational paradigms, such as virtual machines, jobs, remote procedure calls, traditional servers, etc.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
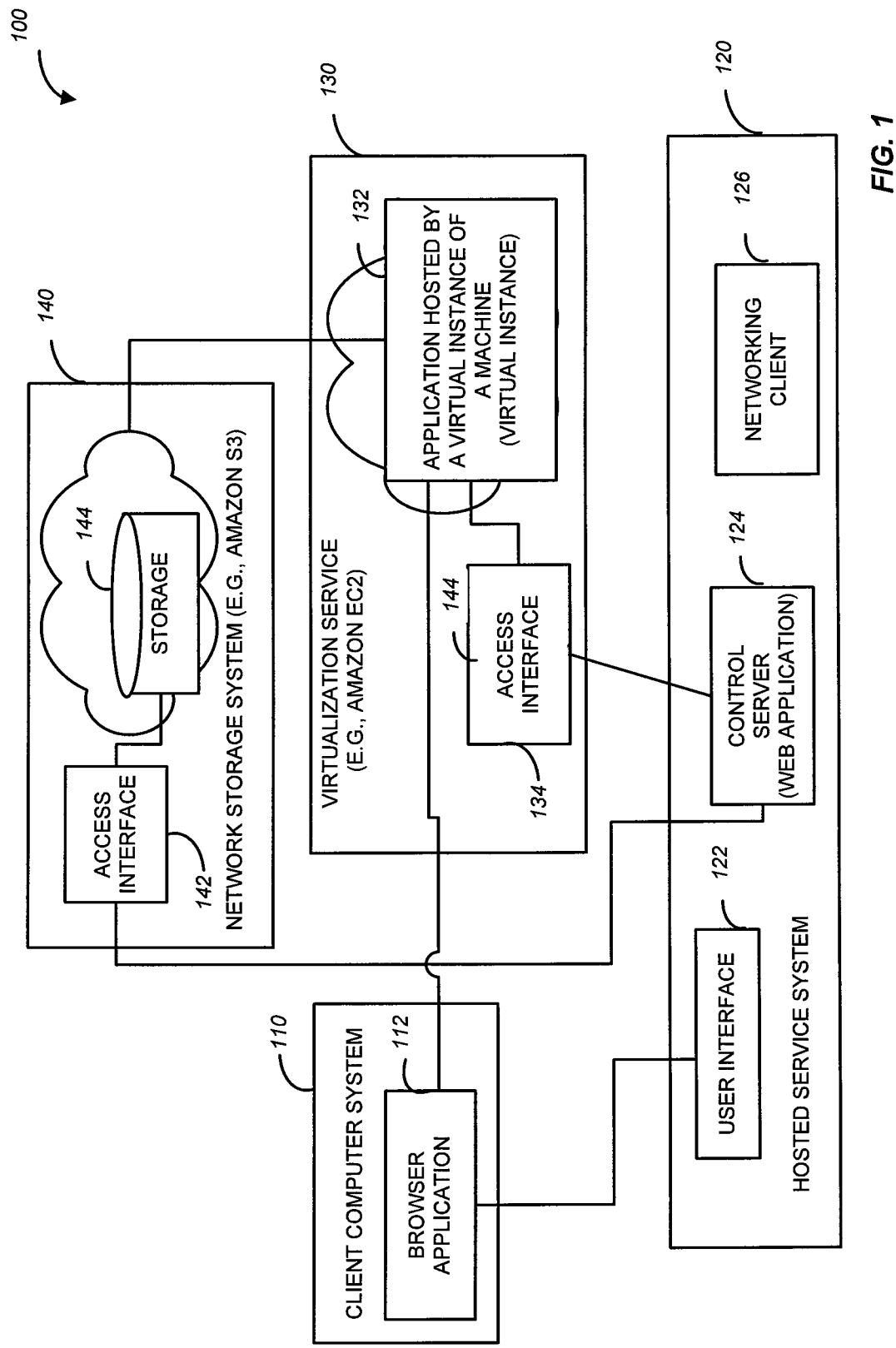
FIG. 1 is a block diagram showing an architecture within which a method and system to manage a computing application hosted by a virtual instance of a machine may be implemented, in accordance with an example embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

A system and method are described for provisioning and managing virtual instances of a computing application running within a public virtualization space, such as the virtualization space provided by Amazon's Elastic Compute Cloud (EC2) service. A system for provisioning and managing a computing application hosted on an instance of a virtual machine may be referred to as a hosted service system. In one example embodiment, a hosted service system may be configured to provide automated administration of the computing application, replacing the administration tasks that would otherwise be performed by the customer when running in an on-premise production deployment. In addition, a hosted service system may be configured to provide encrypted networking and other services that are specific to the public virtualization environment and are designed to provide a secure integration fabric between a customer's own private data center and virtual instances of the computing application running within an insecure public virtualization service. The technology within an example hosted service system may hide the behavior of the underlying virtualization service and the insecure network environment, and provide instances of a computing application that are substantially indistinguishable (e.g., in terms of reliability, security, and performance) from local on-premise deployments of the computing application.

An example computing application that a hosted service system may provision and manage is Adobe® LiveCycle® Enterprise Suite (ES) offered by Adobe Systems Incorporated ("LiveCycle"). It will be noted, that while embodiments of the hosted service system are described with reference to LiveCycle, the hosted service system may be utilized advantageously to provision and manage any computing application within a public virtualization space. Furthermore, while references are made to Amazon EC2 service, other virtualization services may be utilized.

In operation, a user can access a provider's web site and request to launch a computing application that can be deployed remotely on a virtual instance of a machine (on a cloud) such that the user no longer is required to deploy the computing application locally, within their own data center, on their own hardware. A request may be triggered by a user, e.g., by activating a visual control such as a "Start" button presented on a web page. In response to such request, the generic instance of the requested computing application is provisioned on a cloud and then personalized in accordance with the specific user's requirements.

When a hosted service system receives a request from a client computer system to launch a computing application, a call is made to the application programming interface (API) associated with the virtualization service to trigger the loading of the machine image associated with the requested computing application. The machine image is a read-only boot image for a virtual instance. The associated virtual instance launched on a cloud is loaded with the contents of the machine image. The virtual instances launched by the virtualization service are transient, meaning that they do not persist in any way after they are terminated. Thus, no changes that may be made to a virtual instance after booting are reflected in the associated machine image. In one example embodiment, a hosted service system is provided to facilitate establishing a secure communications channel for communications with the virtual instance and for configuring a personalized state of the virtual instance over the secure communications channel.

An example method and system to provision and manage a computing application hosted by a virtual instance of a machine (also referred to as merely "virtual instance") may be described with reference to an architecture diagram illustrated in FIG. 1. The architecture 100 may include a client computer system 110 and a hosted service system 120. In one example embodiment, the hosted service system 120 is to provision and manage an enterprise SaaS product (e.g., virtual instances of LiveCycle) utilizing a cloud-based computing service as a virtualization infrastructure. Cloud based computing services are shown in FIG. 1 as a virtualization service 130 and a network storage service 140. In one embodiment, a hosted service system 120 utilizes Amazon EC2 as a virtualization service and Amazon Simple Storage Service (Amazon S3) as a network storage service. The client computer system 110 and the hosted service system 120 may be in communication with each other via a communications network that may be a public network (e.g., the Internet).

The virtualization service 130 may load a virtual instance 132 running the computing application onto a cloud. The virtual instance 132 may be accessed by the client 110 via a browser application 112. As mentioned above, a user in control of the client computer system may send a request to the hosted service system 120 to load the computing application. The request may be initiated via a user interface 122 provided by the hosted service system 120 to the client computer system 110 via the browser application 112.

The user interface 122, in one embodiment, provides both an end-user's and a system administrator's view of the virtual instance (that runs the computing application) and also permits issuing control operations to the virtual instance and permits viewing the resulting changes in the state of the computing application. For example, where the computing application is LiveCycle, an end-user may manipulate various electronic forms. The user interface 122 may also serve as a source of information for the hosted service system, including documentation, downloads, and support. The user interface 122, in one embodiment, uses Adobe® Flex® software, offered by Adobe Systems Incorporated, as the user interface technology for the implementation of the user interface. The user interface 122, in one embodiment, uses an XML (Extensible Markup Language)-based representational state transfer (REST) style secure communications protocol to synchronize its operations with the control server 124. A request to access the user interface may be authenticated using one of a variety of authentication techniques.

The request from the client computer system 110 to load the virtual instance 132 is received at the control server 124, which responds to the request by activating an access interface 134 provided by the virtualization service 130. The control server 124, in one example embodiment, provides coordination between the components of the architecture 100, provides administration and monitoring of the virtualization service 130, and also may be configured to audit system usage and resource allocation with respect to the virtual instance 132. The control server 124 includes a database to store information pertaining to various aspects of system usage. The control server 123, in one embodiment, runs within a standard Hypertext Transfer Protocol Secure (HTTPS)-compliant web server and may be deployed as a publically accessible web application that is available outside a firewall. The control server 123, in one embodiment, is implemented using Ruby on Rails™ technology.

The virtualization service 130 accesses the storage 144 of the network storage system 140 to obtain a machine image in order to load the associated virtual instance 132. The machine image can be uploaded to the network storage system by the control server 124 utilizing an access interface 142 provided with the network storage system 140. As mentioned above, the machine image obtained by the virtualization service 130 from the network storage system 140 permits the virtualization service 130 to load a generic virtual instance—a virtual instance running the computing application in a state that is neither personalized for any particular user nor reflects any state that is different from a newly installed computing application. In order to facilitate personalization of the computing application running as part of the virtual instance, the control server 124 loads a public encryption key and a certain launch configuration onto the network storage 144, which is accessible by the virtualization service 130, and provides additional information to the virtual instance 132 to permit the virtual instance 132 to configure the computing application to a desired state.

The communications between the virtual instance 132 and the control server 124, after the public key and launch configuration have been retrieved from the network storage 144, may include monitoring the state of the virtual instance 132 and providing additional information to the virtual instance 132. For example, the virtual instance 132 may request from the control server 124 the private encryption key. The control server 124 may also monitor the state of the virtual instance 132 as the personalization process progresses, and periodically update its database with the status of the personalization process. This monitoring continues after personalization is complete, for as long as the virtual instance 132 remains executing.

The hosted service system 120 further includes a secure networking client 126 to provide a bidirectional, encrypted, compressed connection between a machine in the end-user's secure network environment (e.g., the client computer system 110) and a virtual instance running within the virtualization infrastructure (the virtual instance 132). The networking client 126 manages various aspects of transmission control protocol (TCP) traffic forwarding, encryption, and network discovery, such that the user can access the virtual instance 132 as if it was running locally on the user's machine. In this mode, the user's network security envelope is extended to surround the virtual instance 132 using comparable levels of encryption and protection against network security threats.

An example system to manage a computing application running on a virtual instance may be discussed with reference to FIG. 2.

Figure 2:
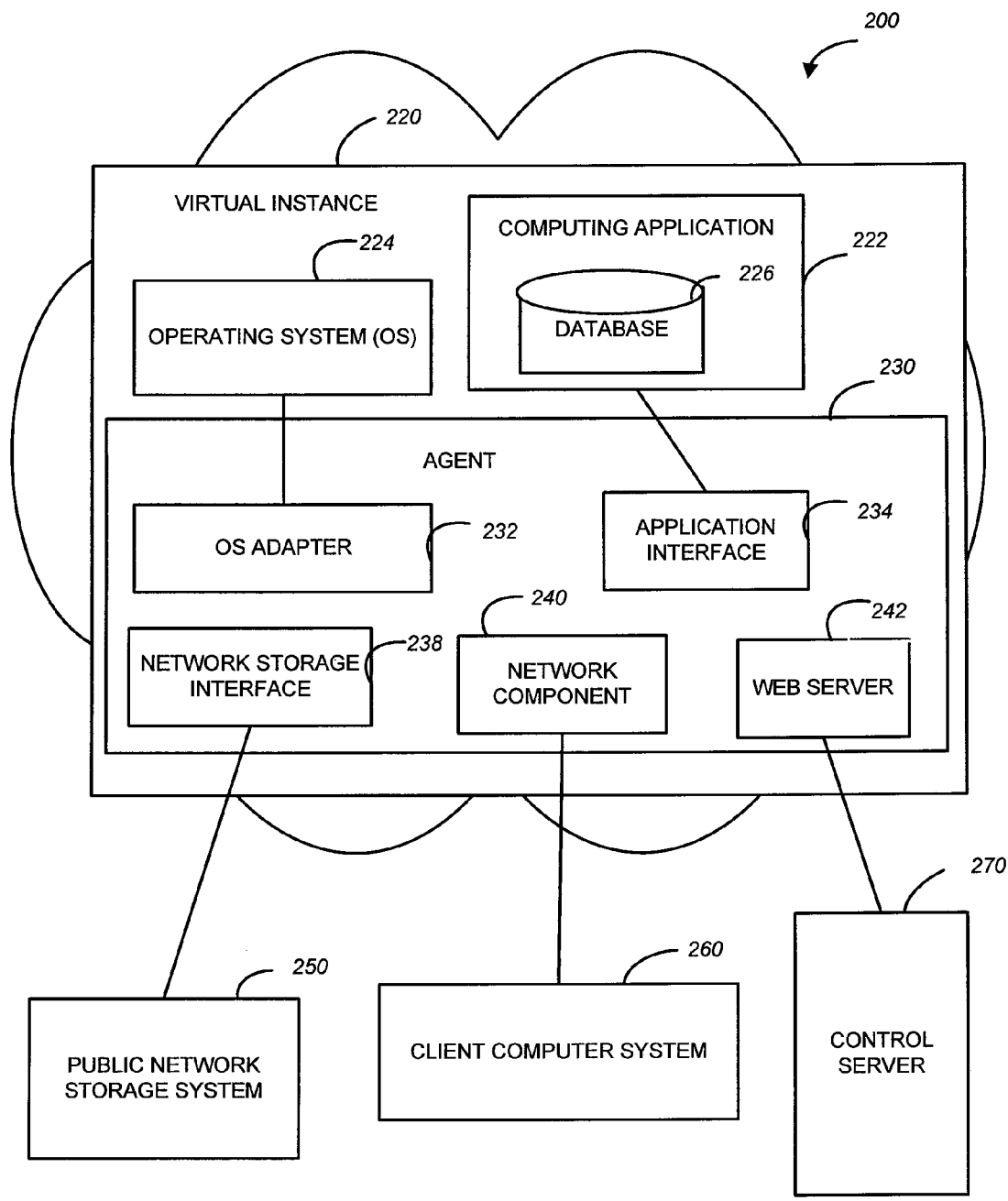
FIG. 2 is a block diagram illustrating a system to provision and manage a computing application hosted by a virtual instance of a machine, in accordance with an example embodiment.

FIG. 2 shows a block diagram illustrating a system 200, where a virtual instance is running on a cloud, according to one example embodiment. As shown in FIG. 2, the system 200 includes a virtual instance 220 that is in communication with a network storage system 250, a client computer system 260, and a control server 270. The virtual instance 220 comprises an operating system 224, a computing application 222 and its associated database 226, and an agent 230.

The agent 230 is provided to permit communications between the virtual instance 220 and the network storage system 250, the client computer system 260, and the control server 270. The agent 230 includes an operating system (OS) adapter 232 to facilitate communication between the agent 230 and the operating system 224 and an application interface 234 to facilitate communications between the computing application 222 and the agent 230. A network storage interface 238 is configured to facilitate communications between the network storage system 250 and the agent 230. A network component 240 is configured to facilitate communications between the client computer system 260 and the agent 230. A public web server 242 is configured to facilitate communications between the control server 270 and the agent 230.

The control server 270, in one example embodiment, is a web server that provides a web application architecture, in which objects are modeled within a relational database and actions performed on those objects are methods within a set of controllers. Example controllers include a site controller, an EC2 controller, and an administration controller. The site controller supports the user interface and handles all command functions. The EC2 controller acts as an adapter to the Amazon EC2 API and handles commands directed to the virtual instance 220. The EC2 controller also monitors the state of the virtual instance 220. The administration controller supports several asynchronous background operations that run periodically to monitor usage, resource limits, and the state of Amazon's EC2 service and the virtual instance running within it. These controllers operate upon the following object models. The user object represents each authenticated user within the hosted service system 120. The instance object monitors all aspects of the state of the virtual instance 220. The image object represents an EC2 AMI within the hosted service system 120 and is used to translate command requests to start instances into actual running instances within EC2. Some components of the control server 270 may be described with reference to FIG. 3.

Figure 3:
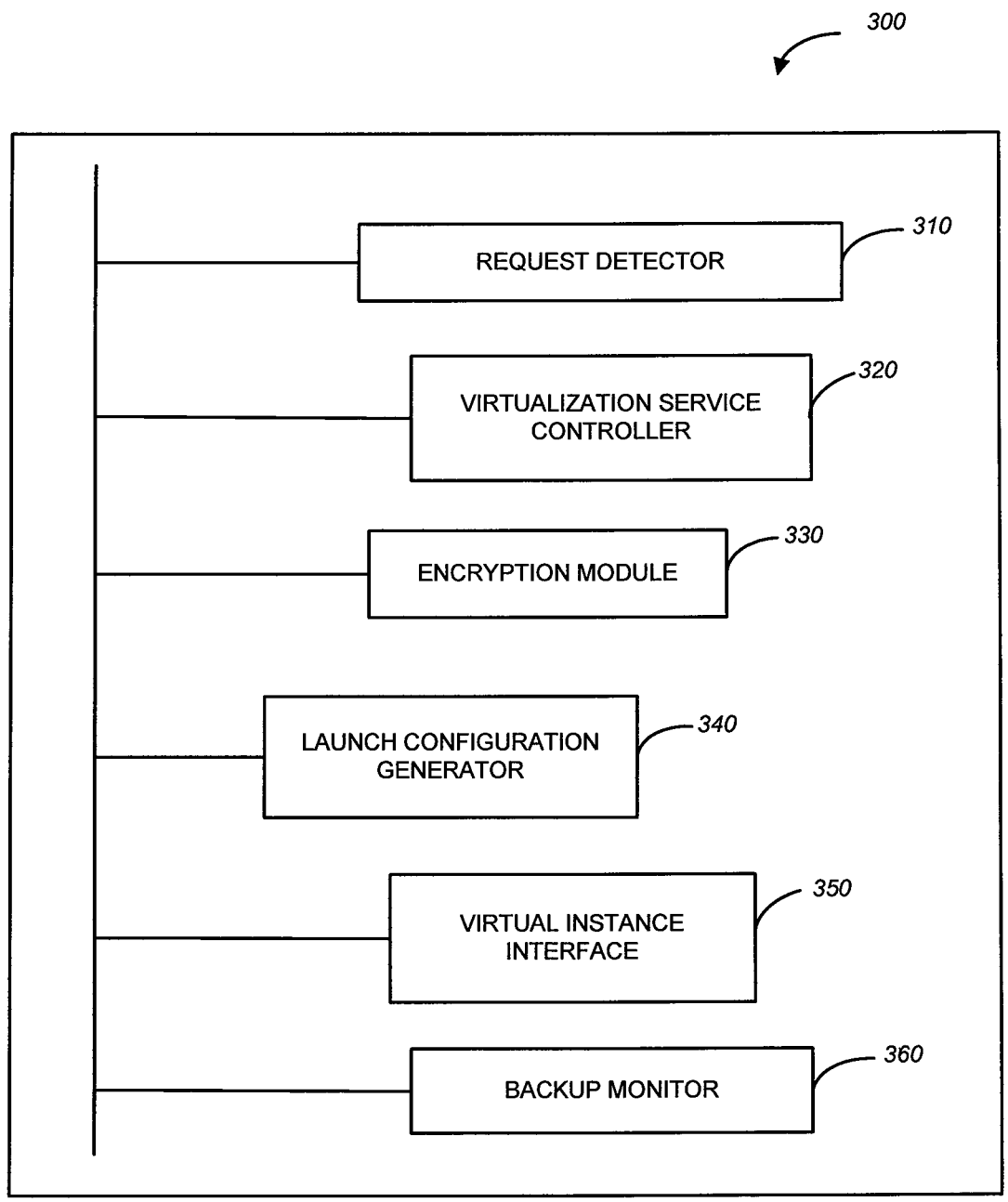
FIG. 3 is a block diagram illustrating some components of a control server, in accordance with an example embodiment.

FIG. 3 is a block diagram illustrating a control server 300, in accordance with an example embodiment. As shown in FIG. 3, the control server 300 is provided with the hosted service system 120 of FIG. 1 and comprises a request detector 310, a virtualization service controller 320, an encryption module 330, a launch configuration generator 340, and a virtual instance interface 350. The request detector 310, which may be implemented as a site controller discussed above, may be configured to receive a request from a client computer system to instantiate a computing application on a cloud. The virtualization service controller 320 may be configured to request that a virtualization service loads a virtual instance. As explained above, the virtual instance comprises a virtual computing system hosting the computing application. The encryption module 330 may be configured to provide a public encryption key to a network storage system. The public encryption key is used for establishing a secure communication channel between the hosted service system 120 and the virtual instance. The launch configuration generator 340 may be configured to generate a launch configuration based on the request from the client computer system and to provide a launch configuration to the network storage system. The launch configuration is associated with a personalized state of the computing application and may include information identifying the owner of the virtual instance and a requested state of the computing application. In one embodiment, the launch configuration generator 340 generates a launch configuration that includes an instruction to restore a state of the computing application reflected in a backup object created and stored at a network storage system by the virtual instance. The virtual instance interface 350 may be configured to facilitate configuring the virtual instance according to the launch configuration via the secure communications channel.

The control server 300 may further include a backup monitor 360. The backup monitor 360, in one example embodiment, may be configured to monitor backup operations performed by the virtual instance and to store data indicating a location of a backup object generated by the backup operation. The backup object may be used to restore the state of the computing application the next time the same user requests that the computing application is instantiated on a cloud. The backup monitor 360 may be implemented as an administration controller discussed above with reference to FIG. 2.

In one example embodiment, the control server 300 may be configured to detect whether a request from the client computer system to instantiate a computing application indicates that the computing application is to be loaded in a default state or in a persisted, previously stored state. If the request indicates that the computing application is to be loaded in a previously stored state, the encryption module 330 pushes a private decryption key onto the virtual instance. The private decryption key may be used by the virtual instance for decrypting an encrypted backup object stored at the network storage system.

Figure 4:
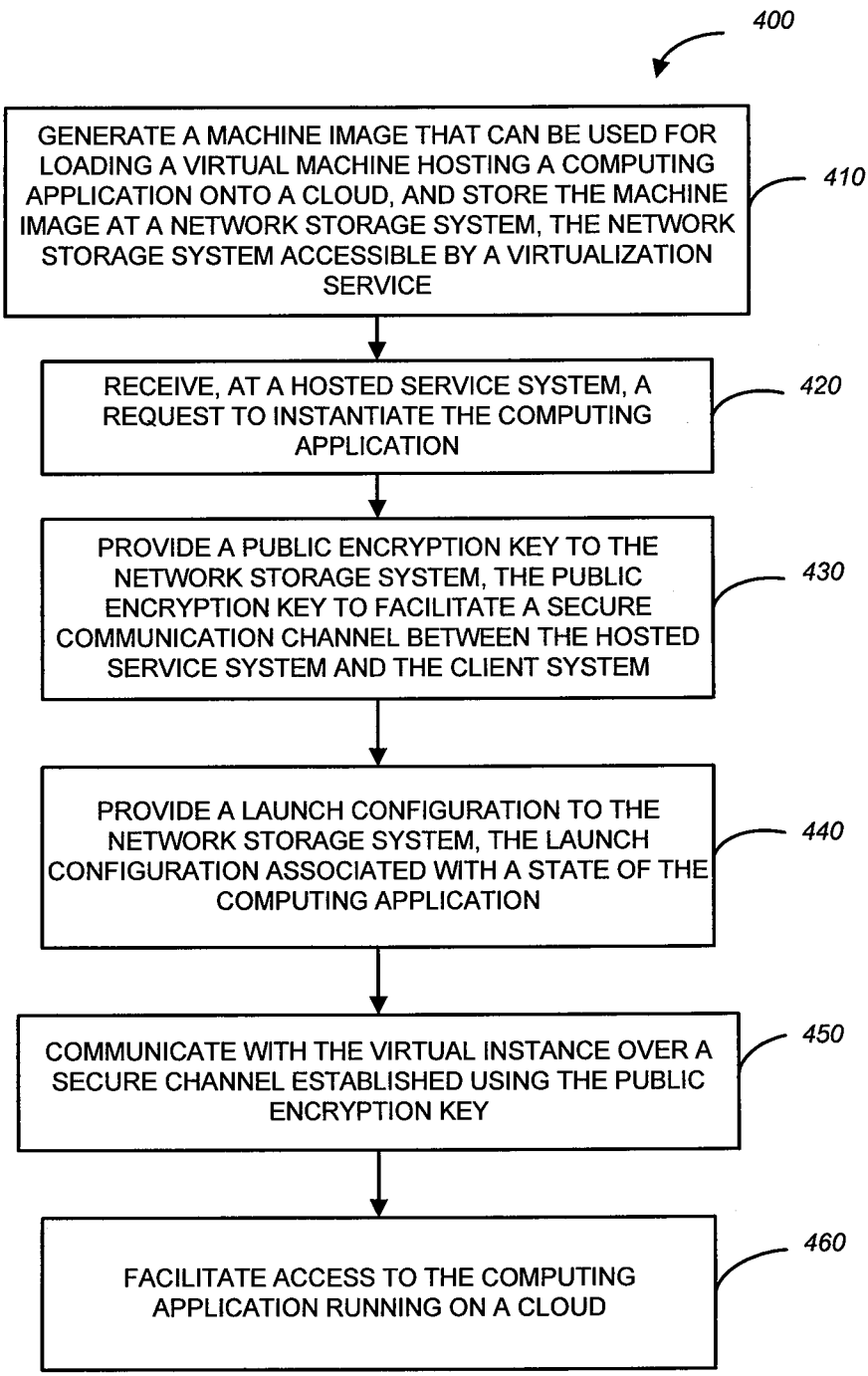
FIG. 4 is a flow chart illustrating a method to provision a secure personalized virtual machine instance, in accordance with an example embodiment.
Figure 5:
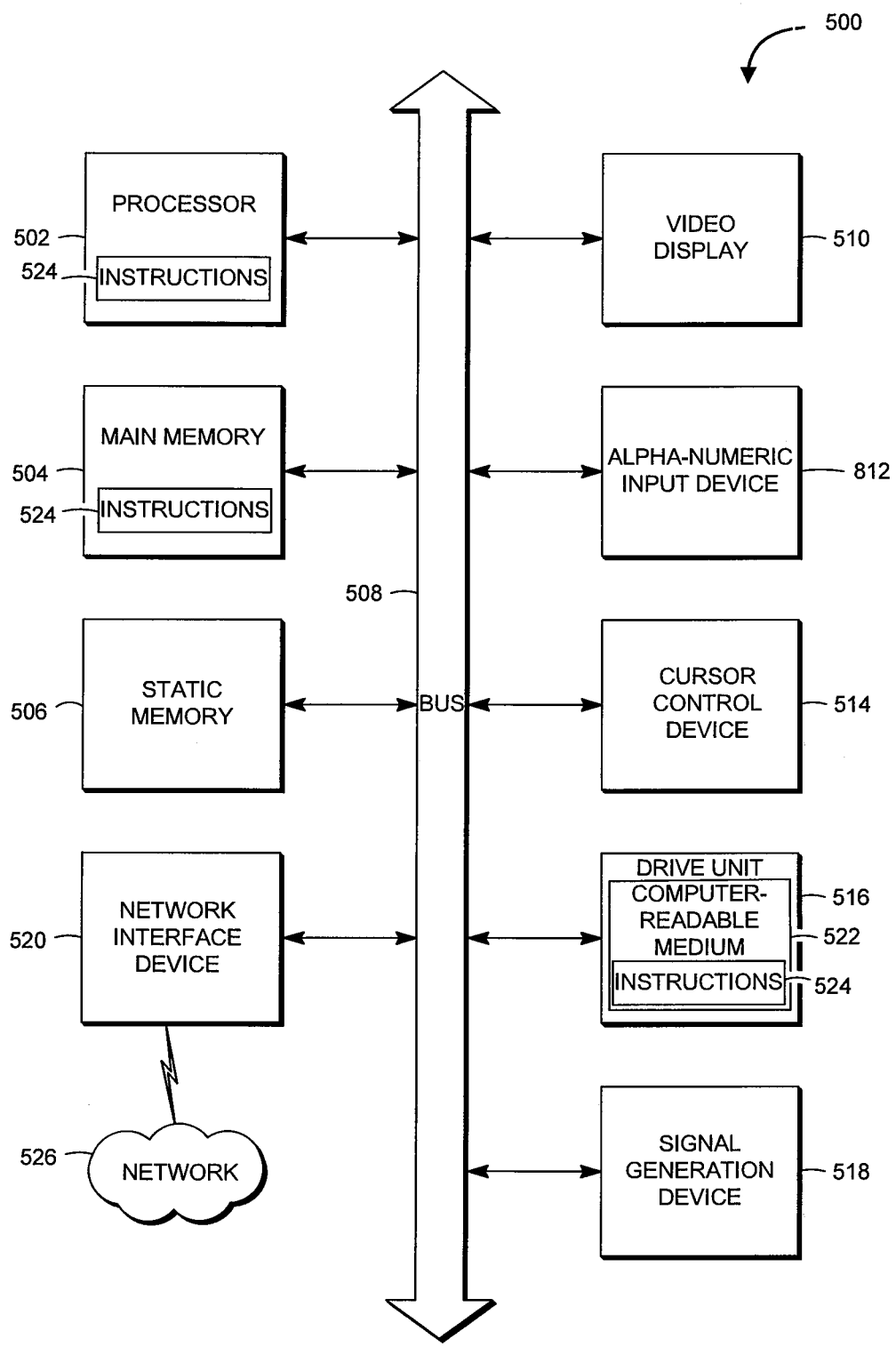
FIG. 5 is a diagrammatic representation of a machine in the example form of a computer system within which a set of instructions, for causing the machine to perform any one or more of the methodologies discussed herein, may be executed.

FIG. 4 is a flow chart illustrating a method 400 to provision a secure personalized virtual machine instance, in accordance with an example embodiment.

The method 400 may be performed by processing logic that may comprise hardware (e.g., dedicated logic, programmable logic, microcode, etc.), software (such as run on a general purpose computer system programmed to perform particular functions pursuant to instructions from program software or on a dedicated machine), or a combination of both. The processing logic, according to example embodiments, may reside in any of the modules shown in FIG. 1 and FIG. 3. The modules illustrated in FIG. 1 and FIG. 3 may be implemented as software, hardware, or a combination of both.

As shown in FIG. 4, the method 400 commences with operation 410, where the hosted service system 120 of FIG. 1 generates a machine image that can be used by the virtualization service 130 of FIG. 1 to load a virtual instance including a computing application. The hosted service system 120 stores the generated machine image on the network storage system 140 of FIG. 1. At operation 420, the controller 124 of FIG. 1 receives a request to instantiate the computing application. At operation 420, the controller 124 requests that the virtualization service 130 loads a virtual instance comprising a virtual computing system hosting the computing application. At operation 430, the controller 124 provides a public encryption key to the network storage system 140. As explained above, the public encryption key is used for establishing a secure communication channel between the hosted service system 120 and the virtual instance. At operation 440, a launch configuration (e.g., in a form of a file) is generated based on the request from the client computer system. The controller 124 provides the launch configuration to the network storage system 140. The controller 124 communicates with the virtual instance via the secure communications channel established between the hosted service system 120 and the virtual instance at operation 450. The secure communications channel makes it possible to secure the configuration and the state of the virtual instance within a public virtualization provider such as the virtualization service 130.

FIG. 11 is a diagrammatic representation of a machine in the example electronic form of a computer system 1100 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) cursor control device 1114 (e.g., a mouse), a disk drive unit 1116, a signal generation device 1118 (e.g., a speaker) and a network interface device 1120.

The disk drive unit 1116 includes a computer-readable (or machine-readable) medium 1122 on which is stored one or more sets of instructions and data structures (e.g., software 1124) embodying or utilized by any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120 utilizing any one of a number of well-known transfer protocols (e.g., Hyper Text Transfer Protocol (HTTP)).

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention, or that is capable of storing or encoding data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like.

Thus, method and system method for provisioning and managing a computing application hosted by a virtual instance of a machine have been described. The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A computer-implemented method comprising:
using one or more processors at a hosted service system to perform operations of:
receiving a request from a client computer system to instantiate a computing application;
in response to the request from the client computer system to instantiate the computing application:
requesting that a public virtualization service loads a virtual instance, the virtual instance being a virtual computing system hosting the computing application,
providing a public encryption key to a public network storage system, the public encryption key to facilitate a secure communication channel between the hosted service system and the virtual instance,
generating a launch configuration based on the request from the client computer system, the launch configuration including an instruction to employ an encrypted object stored at the public network storage system to provide a personalized state of the computing application,
providing the launch configuration to the public network storage system; and
facilitating configuring the virtual instance according to the launch configuration via the secure communication channel established between the virtual instance and the hosted service system using the public encryption key, the configuring including pushing a private decryption key from the hosted service system over the secure communication channel to the virtual instance to allow the virtual instance to decrypt the encrypted object and using the secure communication channel to monitor a state of the virtual instance, wherein the virtual instance is accessible by the client computer system via a browser application executing on the client computer system.

2. The method of claim 1, wherein the method further comprises storing a machine image at the public network storage system, the machine image to be used, by the public virtualization service, for loading the virtual instance, the machine image including an operating system, the computing application, and an agent to facilitate communication between the virtual instance and the public network storage system, the client computer system, and the hosted service system.

3. The method of claim 1, wherein the computing application is an enterprise software application.

4. The method of claim 1, wherein the launch configuration includes:
information identifying an owner associated with the virtual instance; and
a requested state of the computing application.

5. The method of claim 4, wherein the requested state is a default state of the computing application.

6. The method of claim 4, wherein the requested state is a persisted state of the computing application.

7. The method of claim 1, further comprising:
monitoring a backup operation performed by the virtual instance; and
storing data indicating a location of a backup object, the backup object generated by the backup operation.

8. A method comprising:
executing instructions on a first specific apparatus that result in digital electronic signal implementation of a process in which a request from a client computer system to instantiate a computing application is detected;
executing instructions on a second specific apparatus that result in digital electronic signal implementation of a process in which a request that a public virtualization service loads a virtual instance, the virtual instance being a virtual computing system hosting the computing application;
executing instructions on a third specific apparatus that result in providing a public encryption key to a public network storage system, the public encryption key to facilitate a secure communication channel between a web server and the virtual instance;
executing instructions on a fourth specific apparatus that result in generating a launch configuration object based on the request from the client computer system, the launch configuration object including an instruction to employ an encrypted object stored at the public network storage system to provide a personalized state of the computing application and providing the launch configuration object to the public network storage system; and
executing instructions on a fifth specific apparatus that result in facilitating configuring the virtual instance according to the launch configuration object via the secure communication channel established between the virtual instance and the web server using the public encryption key, the configuring including pushing a private decryption key from the web server over the secure communication channel to the virtual instance to allow the virtual instance to decrypt the encrypted object and using the secure communication channel to monitor a state of the virtual instance, wherein the virtual instance inaccessible by the client computer system via a browser application executing on the client computer system.

9. A computer-implemented system comprising:
a request detector to receive a request from a client computer system to instantiate a computing application;
a virtualization service controller to request that a public virtualization service loads a virtual instance, the virtual instance being a virtual computing system hosting the computing application;
an encryption module to provide a public encryption key to a public network storage system, the public encryption key to facilitate a secure communication channel between a hosted service system and the virtual instance;
a launch configuration generator to generate a launch configuration based on the request from the client computer system, the launch configuration including an instruction to employ an encrypted object stored at the public network storage system to provide a personalized state of the computing application and provide the launch configuration to the public network storage system; and
a virtual instance interface to facilitate configuring the virtual instance according to the launch configuration via the secure communication channel established between the virtual instance and the hosted service system using the public encryption key, the configuring including pushing a private decryption key from the hosted service system over the secure communication channel to the virtual instance to allow the virtual instance to decrypt the encrypted object and using the secure communication channel to monitor a state of the virtual instance, the virtual instance accessible by the client computer system via a browser application executing cm the client computer system.

10. The system of claim 9, wherein the virtualization service controller is to store a machine image at the public network storage system, the machine image to be used, by the public virtualization service, for loading the virtual instance, the machine image including an operating system, the computing application, and an agent to permit communications between the virtual instance and the public network storage system, the client computer system, and the hosted service system.

11. The system of claim 9, wherein the computing application is an enterprise software application.

12. The system of claim 9, wherein the launch configuration includes:
   owner information associated with the virtual instance; and
   a requested state of the computing application.

13. The system of claim 9, wherein the requested state is a default state of the computing application.

14. The system of claim 9, wherein the requested state is a persisted state of the computing application.

15. The system of claim 9, further comprising a backup monitor, the backup monitor to:
   monitor a backup operation performed by the virtual instance; and
   store data indicating a location of a backup object, the backup object generated by the backup operation.

16. A machine-readable non-transitory storage medium having instruction data stored thereon to cause a machine to:
   store a machine image and an encrypted object at a public network storage system;
   receive a request from a client computer system to instantiate a computing application;
   request that a public virtualization service loads a virtual instance utilizing the machine image, the virtual instance being a virtual computing system hosting the computing application, the machine image including an operating system, the computing application, and an agent to facilitate communications between the virtual instance and the public network storage system, the client computer system, and a hosted service system;
   provide a public encryption key to a public network storage system, the public encryption key to facilitate a secure communication channel between the hosted service system and the virtual instance;
   generate a launch configuration based on the request from the client computer system, the launch configuration including an instruction to employ the encrypted object stored at the public network storage system to provide a personalized state of the computing application;
   provide the launch configuration to the public network storage system; and
   facilitate configuring the virtual instance according to the launch configuration via the secure communication channel established between the virtual instance and the hosted service system using the public encryption key, the configuring including pushing a private decryption key from the hosted service system over the secure communication channel to the virtual instance to allow the virtual instance to decrypt the encrypted object and using the secure communication channel to monitor a state of the virtual instance, the virtual instance accessible by the client computer system via a browser application executing on the client computer system.

* * * * *